Patented Aug. 4, 1936

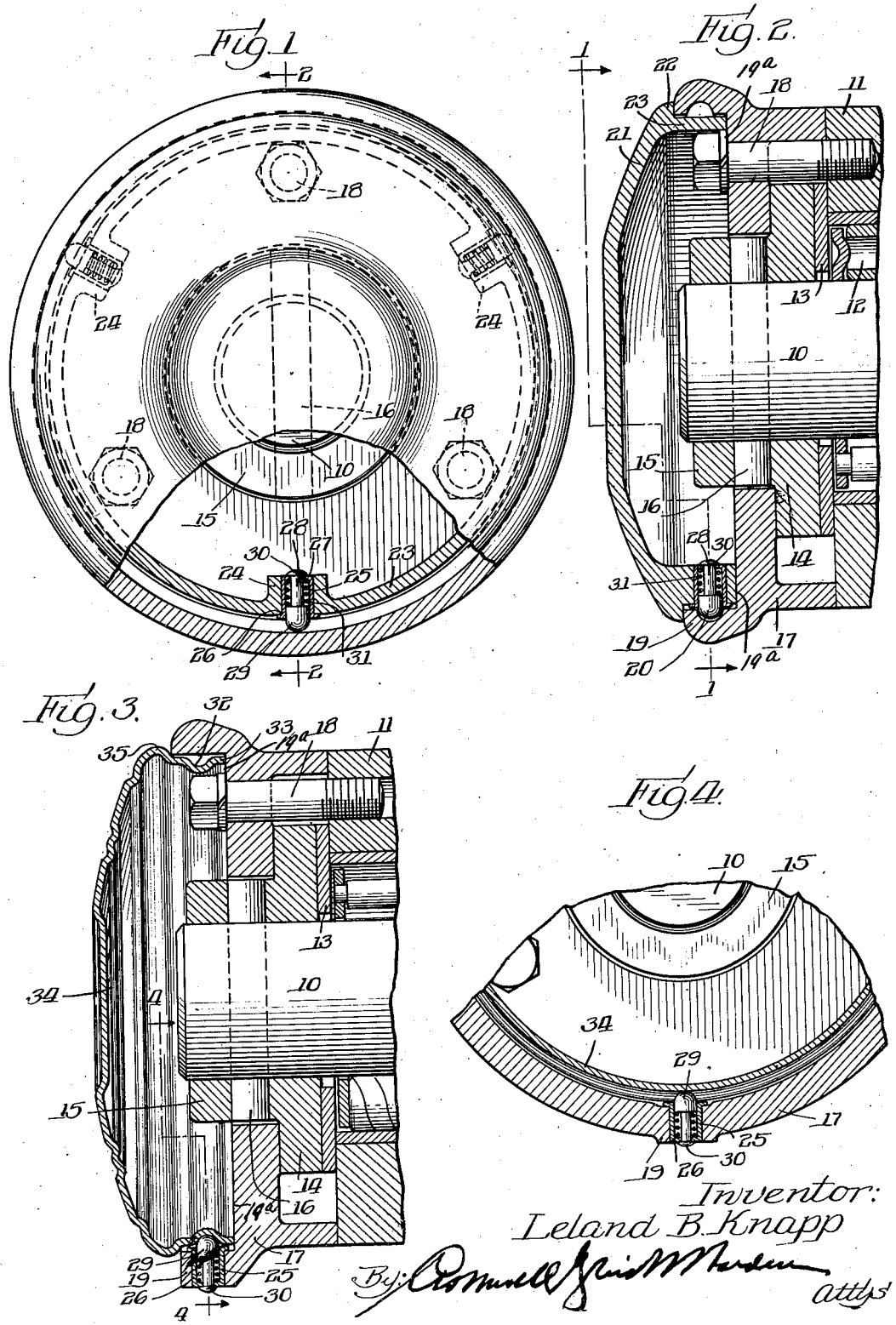

2,049,566

UNITED STATES PATENT OFFICE 2,049,566

WHEEL STRUCTURE

Leland G. Knapp, Chicago, Ill., assignor to Montgomery Ward & Co., Incorporated, Chicago, Ill., a corporation of Illinois Application July 25, 1932, Serial No. 624,491

1 Claim. (Cl. 301—108)

The invention herein disclosed relates to wheel constructions primarily intended for use on farm wagons of the type covered by my pending application for Letters Patent of the United States filed May 2, 1932, Serial No. 608,706.

The object of the present invention is to provide a hub cap for the wheel construction referred to adapted to close the open end of the hub and protect the mounting thereof against ingress and accumulation of dirt, sand and other foreign matter liable to impose undue wear on the related working parts and interfere with the freedom of movement of the same.

A further object of the invention is to construct the hub cap in such fashion that it may be readily assembled upon and removed from the hub, thus providing for its detachable connection with the hub, its construction being such as to require no special tools for this purpose.

Other objects will appear as the nature of the improvement is better understood, the invention consisting substantially in the novel construction, combination and arrangement of parts hereinafter fully described, illustrated in the accompanying drawing, and finally pointed out in the appended claim.

The forms of the invention herein disclosed are believed to be practical embodiments thereof, but the same are susceptible of change, modification and variation, and the present disclosure, therefore, is not to be taken as imposing undue restriction on such forms and embodiments.

In the drawing,

Fig. 1 is an end elevation of a hub equipped with a cap constructed in accordance with the present invention, parts being broken away to illustrate the internal construction of the cap and its assembled relation with the hub;

Fig. 2 is a vertical transverse sectional view, as on the line 2—2, Fig. 1;

Fig. 3 is a view similar to Fig. 2 illustrating another embodiment of the invention;

Fig. 4 is a view similar to Fig. 1 of the construction shown in Fig. 3.

Referring in detail to the accompanying drawing, the numeral 10 designates the spindle of an axle on which is mounted a hub 11 with certain interposed roller bearings 12. Adjacent to the end of the hub 11 is a spacing washer 13 next to which is a fastening collar 14 having a reduced neck 15 through which is passed a locking pin 16 for holding the fastening collar 14 in position on the spindle 10. A clamping collar 17, secured to the hub 11 by lag bolts 18, fits over the fastening collar 14.

The parts above described embrace the construction of wheel and its bearings illustrated, described and claimed in my pending application Serial No. 608,706, above referred to, and require no further description.

It will be observed that the clamping collar 17 has an outwardly-extending circumferential flange 19 the inner face of which is horizontal and has an annular groove 20 formed therein, which groove extends entirely around the inner face of the flange 19. Set back from the outer face of the clamping collar 17 within the flange 19, and extending at right angles to the inner horizontal face of the flange 19, is a vertical shoulder 19a, which provides a contact abutment for the purpose presently to be described.

Associated with the flange 19 is a hub cap 21. This cap is provided with an external vertically-disposed shoulder 22 which contacts the outer face of the clamping collar 17, and extending at right angles to said shoulder 22 is an inwardly-directed horizontal flange 23 which fits within and is disposed opposite to the inner horizontal face of the flange 19, the inner end of the flange 23 abutting against the vertical shoulder 19a of the clamping collar 17.

Arranged at separated points about the flange 23 is a series of radially-disposed bosses 24 which are perforated, each of said bosses receiving a thimble 25. Each of said thimbles 25 has a laterally-directed flange 26, said flanges being seated against the peripheral face of the flange 23, the thimbles 25 being suitably held within the perforations of the bosses 24. At the inner end of each of the thimbles 25 is a perforation 27 through which the shank 28 of a slidable locking detent 29 is passed, the inner end of the shank 28 projecting beyond the inner end of the thimble 25 and terminating in a head 30 which seats against the inner end of the thimble. The detent 29 is of larger diameter than the shank 28, a coil spring 31 being mounted about the shank 28 and having its inner end seated against the inner end of the thimble 25, while the outer end of said spring is seated against the detent 29. The spring 31, therefore, serves to urge the detent 29 normally outwardly. The outer end of the detent is rounded and engages the circumferential groove 20 of the flange 19 when brought into registry therewith. Any number of the locking detents may be employed, but, as illustrated in Fig. 1, three are shown arranged at distributed points, and each designed to engage the groove 20 when the flange 23 of the cap 21 is introduced into the outer end of the clamping collar 17.

It will be evident that when the flange 23 is positioned as above mentioned the locking detents 29 will ride over the edge of the flange 19, the springs 31 being compressed in such movement and permitting the detents to recede sufficiently so as to permit the cap 21 to be assembled on the clamping collar 17. When the detents enter the groove 20, the springs 31 expand and force the detents into the groove, whereupon the cap 21 is held in locked relation to the clamping collar 17. To remove the hub cap from the clamping collar it is merely necessary to exert outward pressure thereon so as to release the detents 29 from the groove 20, and when this has been done the cap 21 readily may be separated from the clamping collar.

In Figs. 3 and 4 is illustrated another embodiment of the invention. As distinguished from the form shown in Figs. 1 and 2 the detents 29 are carried by the flange 19 of the clamping collar 17, the thimbles 25 being held in openings 26 formed in the flange 19. The detents 29 thereby are reversed to the positions shown in the form illustrated by Figs. 1 and 2. This entails the formation of an annular groove 32 in the outer face of the inwardly-extending flange 33 of the hub cap 34, said groove 32 extending circumferentially about the flange 33. When the latter is introduced to the flange 26 of the clamping collar 17, the detents 29 readily seat in the groove 32, and thus establish the locked relation between the cap 34 and the clamping collar 17.

The formation of the cap 34 also is slightly different from the formation of the cap 21, a bead 35 being embodied in the cap 34 and serving to abut the flange 19 in the manner corresponding to the engagement of the shoulder 22 with the flange 19 of the form illustrated in Figs. 1 and 2.

In assembling and detaching the cap 34 upon and from the clamping collar 17, the detents 29 ride over the outer surface of the flange 33 and into engagement with the groove 32 thereof, and likewise recede from said groove on outward pull exerted upon the cap 34, so that engagement of the cap with the clamping collar and detachment of the cap from the latter is effected the same as the engagement and detachment of the cap 21.

I claim:

In a wheel structure, the combination with the hub thereof, and a clamping collar carried by the hub and having an axially-extending circumferential flange the inner face of which is cylindrical and provided with an annular groove therein, said clamping collar also having a radial shoulder within the flange set back from the outer face of the clamping collar and extending in a plane at right angles to the axis of the clamping collar of a hub cap having a flange seated within the flange of the clamping collar and overlapping the annular groove of the aforesaid circumferential flange, the inner end of the flange of the hub cap abutting against said radial shoulder, said cap also having an external shoulder adapted to contact the outer face of the clamping collar, and fastening devices carried by the hub cap and releasably engaging the groove of the circumferential flange to hold the cap on the clamping collar.

LELAND G. KNAPP.